United States Patent [19]

Taylor

[11] 4,168,351

[45] Sep. 18, 1979

[54] STABILIZED GLASS-TO-METAL SEALS IN LITHIUM CELL ENVIRONMENTS

[75] Inventor: Alwyn H. Taylor, Wellesley Hills, Mass.

[73] Assignee: P. R. Mallory & Co., Inc., Indianapolis, Ind.

[21] Appl. No.: 876,786

[22] Filed: Feb. 10, 1978

[51] Int. Cl.² ............................................. H01M 2/06
[52] U.S. Cl. ...................................... 429/48; 429/174; 429/181; 174/50.61
[58] Field of Search ................. 429/171, 174, 181, 48; 174/50.58, 50.61

[56] References Cited

U.S. PATENT DOCUMENTS

| | | |
|---|---|---|
| 3,248,618 | 4/1966 | Szpak et al. ................ 174/50.61 |
| 3,421,945 | 1/1969 | Michalko ..................... 429/181 |
| 3,639,675 | 2/1972 | Kaino .......................... 174/50.61 |
| 4,053,692 | 10/1977 | Dey ............................. 429/171 |

*Primary Examiner*—Donald L. Walton
*Attorney, Agent, or Firm*—Ronald S. Cornell; Israel Nissenbaum; Charles W. Hoffman

[57] ABSTRACT

Deterioration of a glass-to-metal seal in a lithium cell is prevented by protecting the exposed interior of the glass with a metal oxide or a non-conductive non-reactive polymeric material such as a fluorocarbon or a polyolefin stable in the presence of lithium and other cell components.

10 Claims, 1 Drawing Figure

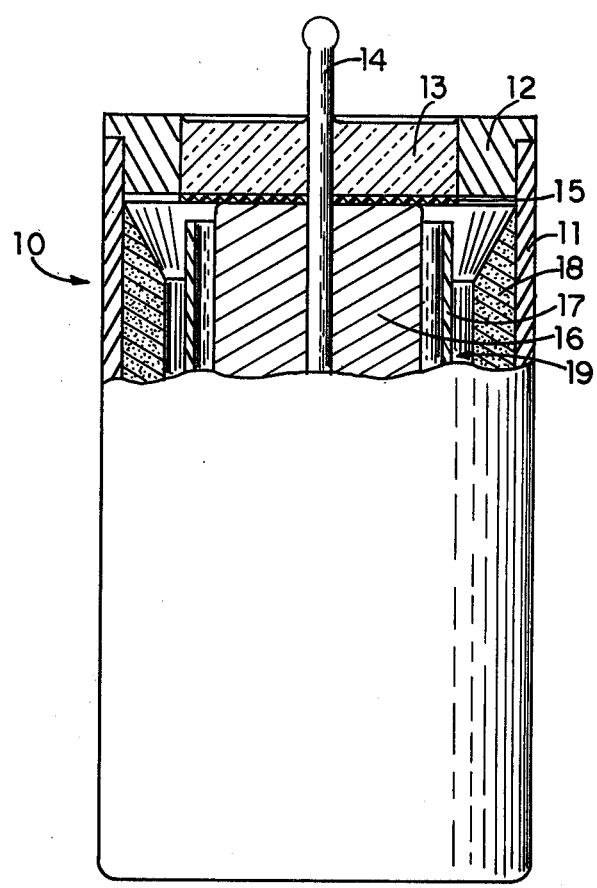

STABILIZED GLASS-TO-METAL SEALS IN LITHIUM CELL ENVIRONMENTS

This invention relates to lithium electrochemical cells which are hermetically sealed by glass-to-metal seals. More particularly this invention relates to lithium cells in which the cathode depolarizers are soluble such as sulfur dioxide ($SO_2$) and thionyl chloride ($SOCl_2$) or solid such as silver chromate ($Ag_2CrO_4$) and $(CF_x)_n$.

In copending application Ser. No. 664,781 filed May 8, 1976, now U.S. Pat. No. 4,053,692, there are described hermetically sealed lithium cells in which glass members insulatingly separate metal terminals of opposite polarity. Additionally, the glass members when used in glass-to-metal seals as described provide true hermetic closures for the cells. While the seals provided by such glasses are a marked improvement over previous crimped over seals they are nevertheless subject to eventual degradation in cell environments at lithium potential. In the seals of the cells of U.S. Pat. No. 4,053,692 assigned to the same assignee as the present invention and prior art glass-to-metal seals used in capacitors and sodium cells the composition of the glass used is generally either a silicate glass having a predominant amount of silicon dioxide ($SiO_2$) or a borosilicate glass which further includes a substantial amount of boron oxide ($B_2O_3$). Typical of the above borosilicate sealing glasses are such glasses as Corning 7052 and Fusite K-glass which have compositions approximating those of the following chart:

| Oxide | Approximate Percentage |
| --- | --- |
| $SiO_2$ | 70–75 |
| $B_2O_3$ | 20 |
| $Al_2O_3$ | 4–8 |
| $Na_2O$ | 4–7 |
| $K_2O$ | 6 |
| $BaO$ | 0–2 |

In the aforementioned prior art capacitors and sodium cells, the above silicate or borosilicate glasses are relatively stable with little or no degradation even under high temperature use. In fact, the sodium cells utilizing glass-to-metal seals have been in the general category of thermal cells. However, these same glasses when used as seals in lithium cells are subject to degradation. This degradation can generally be attributed to the fact that under such conditions the bulk oxides of these glasses are or may be reduced to the metal, non-metal or oxide of reduced oxidation state.

Accordingly, it is an object of the present invention to provide a means by which normally used silicate and/or borosilicate sealing glasses can be protected from long term degradation in lithium cells.

It is a further objective of the present invention to provide a suitable structure in a lithium electrochemical cell in which the glass-to-metal seal is prevented from degrading even under severe usage conditions.

In general, the present invention involves the protection of that portion of the glass in a glass-to-metal seal in a lithium electrochemical cell which is exposed to the interior of such cell. The protection is in the form of a thin layer of a metal oxide which has a free energy of formation in excess of $-100$ Kcal/gm atom of oxygen at 300° K. It has been discovered that such metal oxides will protect the integrity of silicate and borosilicate glasses normally used in glass-to-metal seals.

Examples of these oxides include aluminum oxide ($Al_2O_3$), niobium oxide ($Nb_2O_3$), calcium oxide ($CaO$), magnesium oxide ($MgO$), barium oxide ($BaO$), strontium oxide ($SrO$), zirconium oxide ($ZrO_2$), and beryllium oxide ($BeO$).

The single FIGURE of the drawing schematically shows a protected glass-to-metal seal in a lithium cell environment.

Alternatively, non-conductive, non-reactive polymeric materials, examples of which are polyolefins such as polyethylene and polypropylene, and adhesive fluorocarbons may also be used to protect the silicate or borosilicate sealing glass in the glass-to-metal seal. However, the protective polymer should also be stable with respect to other cell components. Accordingly, polyolefins cannot be used in cells having thionyl chloride ($SOCl_2$) depolarizers but they may be readily used in cells having sulfur dioxide ($So_2$), depolarizers, or solid depolarizers such as silver chromate ($Ag_2CrO_4$), carbon fluoride ($(CF_x)_n$), manganese oxide ($MnO_x$), mercury chromate ($HgCrO_4$), and mercury oxide ($HgO$).

The protective material is applied to the surface of the glass which is to face the interior of the cell after the glass-to-metal seal has been formed. In the formation of electrochemical cells, the glass to metal seal is formed in a member separate from the cell container, e.g. a cell top, which is thereafter attached to the cell container.

In the case of protective metal oxides the original application of the oxide material includes powdering and mechanically applying the oxide material as a thin uniform layer on the glass surface. Examples of such application include spraying and brushing on of the oxide material.

The oxide powder may be uniformly mixed with a volatile solvent such as benzene or acetone such that a paste is formed and the paste can thereafter be spread on the glass surface.

The oxide may also be in the form of a sintered or non-sintered tape. The tape is made to conform to the areal dimension of the glass surface and is thereafter mechanically applied.

After the metal oxide has been applied to the glass surface it is adhered thereto by fusing whereby the glass and metal oxide are heated to a temperature at which the glass becomes tacky. Such temperature for silicate or borosilicate glasses is generally about 1000° C. Optionally, the glass and bonded metal oxide can be further annealed at a lower temperature of about 400° C. to strengthen the integrity of the metal oxide and glass bond.

The thickness of the metal oxide layer need only be of minimal dimensions with good mechanical application of the layer being generally the controlling factor.

Though polymeric materials such as polypropylene and polyethylene are available in usable disc form it is preferable to coat such materials on the glass to provide a more intimate protective layer. A polymeric fluorocarbon material suitable for use in the present invention is one which is resistant to chemical action of the components of the electrolyte cell; is electrically insulating, that is, has an electrical resistivity of at least about $10^{13}$ ohm-cm or higher; is moisture resistant; has good dimensional stability, impact strength, tensile strength and long term stability; flows at elevated temperature; and which will remain a substantially continuous, adherent, electrolyte resistant coating at the usual operating temperatures of the lithium cell.

Suitable polymeric fluorocarbon materials are those comprised of repeating unit having the formula

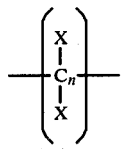

wherein "n" is a whole number equal to or greater than 2 and wherein "X" represents radicals, at least one of which within each repeating unit is a radical other than fluorine. Generally, those radicals in said repeating unit which are not fluorine are selected from the group consisting of chlorine, bromine, hydrogen, $RY_3$, $-ORY_3$, and mixtures thereof wherein Y represents halogen or hydrogen or a mixture thereof, and R is an alkyl chain of 1-6 carbon atoms.

Examples of useful fluorocarbons include: FEP copolymers which are copolymers of fluorinated ethylene and propylene, one such copolymer being marketed as "Teflon" FEP resin by E. I. duPont de Nemours & Co., Inc. of Wilmington, Delaware, U.S.A.; $PVF_2$ which is a homopolymer of vinylidene fluoride one such polymer being marketed as "Kynar" by Pennwalt Corp, Philadelphia, Pa., U.S.A.; ETFE copolymers which are copolymers of ethylene and tetrafluoroethylene; E-CTFE copolymers such as "Halar", sold by Allied Chemical Corp. of Morristown, N.J., U.S.A.; CTFE copolymers which are chlorotrifluoroethylene resins such as "KEL-F" available from 3M Co. or "plaskon" from Allied Chemical Corp.; PVF polymers which are polyvinyl fluoride resins such as "Tedlar," available from E. I. duPont de Nemours & Co. Inc.; and polymers having a fluorocarbon backbone and a perfluoro alkoxy (PFA) side chain wherein the alkoxy radical contains from 1-6 carbon atoms. PFA polymer is available from E. I. duPont de Nemours & Co. Inc. It has been found that conventional polytetrafluoroethylene lacks the ability to properly adhere to glass surfaces and is, therefore, unacceptable for use in the present invention.

In forming the protective layer of the invention, polymeric material is applied to the inner surface of a glass element. The polymeric material can be applied to the surface of the glass element by:

(a) placing a preform of the polymer contiguous to the application surface; or (b) preheating the application surface to a temperature sufficient to cause powdered particles to adhere thereto, and then passing the surface through a fluidized bed containing polymeric material particles suspended in air; or (c) directing powdered particles, entrained in air, toward a preheated application surface from either a hand held or automatic powder spray gun; or (d) brushing polymer particles over the application surface; or (e) dipping the surface in a bath containing powdered polymer particles suspended in a suitable fluid vehicle which causes the polymer particles to adhere to the surface; or (f) blowing powdered polymeric particles past an electrically charged surface;

(g) electrodepositing particles of the material from a particle dispersion in a suitable liquid dispersing medium by dipping the surface into the medium and using electric forces to cause polymers to deposit over the surface.

Polymer applied to the glass surface is treated to cause the polymer to coalesce to form a substantially continuously adhered coating of the polymeric fluorocarbon material. The coating can be permanently adhered to the surface by treating applied particles with heat alone or through the use of a combination of heat and pressure. The amount of heat, or heat pressure, required to form the coating should be sufficient to coalesce the polymer into a unitary, substantially nonporous mass which will adhere to the glass element yet not harmfully affect the desired properties of chemical inertness to electrolyte components and electrical insulation by overheating the particulate material. Generally speaking, a polymeric fluorocarbon powder useful in the present invention has a melting point temperature of about 150° C. to 400° C., and, preferably, a melting point temperature between 225° C. and about 325° C. Usually, the application of pressure reduces the amount of heat required to form the desired adherent coating. Generally speaking, about 2.5 kilograms per square centimeter of higher, and preferably, about 3.5 to 15 kilograms per square centimeter may be applied to the powder during formation of the protective coating.

The single figure of the drawing schematically shows the protected glass-to-metal seal in a lithium cell environment. An electrochemical cell 10 is sealed at its open upper end with a glass-to-metal seal. The components of the glass-to-metal seal include a metal outer ring 12 which is welded or otherwise sealingly attached to the container body 11 at its outer periphery, a silicate or borosilicate glass ring 13 which is sealed at the outer ring 12 and a central metallic fill tube 14 sealed to the central portion of the glass ring 13. The central metallic fill tube 14 serves the dual purpose of providing a conduit for introduction of fluid electrolyte within the cell and acting as a current collector and terminal for the cell. The layer of lithium 16 which comprises the anode or negative terminal of the cell is adhered to a portion of metallic tube 14 and is separated from the glass ring 13 by protective layer 15. The protective layer 15 is any non-conductive material which is stable in a lithium environment or at a lithium potential and which is additionally stable with respect to the electrolyte or electrolyte solvent 19 contained within the cell. Metal oxides having a free energy of formation greater than $-100$ Kcal/gm-atom of oxygen at 300° K. or polyolefins or other polymeric materials, such as adhesive fluorocarbons described above, having similar non-conductive, non-reactive properties provide the requisite protection for the sealing glass. The protective layer 15 completely or substantially completely isolates the glass ring 13 from the interior of the cell. Protective layer 15 need only be of minimal thickness sufficient for covering the exposed inner area of glass ring or member 13. Additional thickness would provide the drawback of decreased cell capacity without concomitant greater protection.

Separator 17 made of a non-conductive ion permeable material such as polypropylene electronically separates the lithium anode 16 from the cathode 18. The cathode 18 comprises a cathode active material such as silver chromate or carbon fluoride $(CF_x)_n$ or a carbonaceous substrate for soluble active cathode materials such as fluid oxyhalides, non-metallic oxides, or non-metallic halides. Such soluble active cathode materials include sulfur dioxide ($SO_2$) and thionyl chloride ($SOCl_2$) as well as phosphorous oxychloride ($POCl_3$), selenium oxychloride ($SeOCl_2$), sulfur trioxide ($SO_3$), vanadium oxytrichloride ($VOCl_3$), chromylchloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$), sulfur monobromide ($S_2Br_2$), and mixtures thereof. Other active cathode materials include $MnO_x$ (with x being approximately 2), $HgCrO_4$, $HgO$, and generally metal halides, oxides, chromates, and dichromates, permanganates, periodates, molybdates, vanadates, chalcogenides, and mixtures thereof.

Electrolyte solvents used in lithium cells include organic solvents such as tetrahydrofuran, propylene carbonate, dimethyl sulfate, dimethyl sulfoxide, N-nitrosodimethylamine, gamma-butyrolactone, dimethyl carbonate, methyl formate, butyl formate, dimethoxyethane, acetonitrile and N:N dimethyl formamide. Electrolyte salts for such cells include light metal salts such as perchlorates, tetrachloroaluminates, tetrafluoroborates, halides, hexafluophosphates, hexalfuoarsenates, and clovoborates.

The metals used for the container and outer annulus and the metallic feed through are determined by their chemical compatibility with cell components such as the electrolyte salt and solvent and the respective cathode and anode materials for which they function as current collectors and/or terminals. Thus, lithium is compatible with metals such as copper, iron, steel, stainless steel of all types, nickel, titanium, tantalum, molybdenum, vanadium, niobium, tungsten, and metal alloys such as Kovar, Inconel, and Monel. These metals can generally comprise the negative or anode current collector and terminal. Accordingly, the fill port 14 as described in the drawing can generally be composed of any of these metals.

Examples of metals and metal alloys which are compatible with sulfur dioxide include aluminum, titanium, tantalum, vanadium, tungsten, niobium, and molybdenum.

Examples of metals compatible with silver chromate include titanium, tantalum, molybdenum, vanadium, chromium, tungsten, and stainless steel.

Examples of metals and metal alloys compatible with the highly oxidizing thionyl chloride include titanium, molybdenum, niobium, tantalum, tungsten, Kovar, Inconel and Monel.

Accordingly, the above metals can be used (with the compatible cathode material) as either the outer metal annulus 12 or as the material of the container 11 in the embodiment exemplified by the drawing.

Various modifications in the positioning, construction, geometry, and materials comprising the cell elements can be made without affecting the scope of the present invention. For example, the metallic feedthrough 14 in the drawing need not be hollow (other means can be used for electrolyte introduction) nor is it even necessary that it extend byond the plane of the cell if its use is only for terminal connection. The positioning of the electrode materials may be reversed and there would still be a requirement for the protective layer since degradation of the glass to metal seal of the present invention would still occur but having its incipiency at the portion of the glass nearest the lithium.

The following examples which relate to cells constructed identically, with and without the protective means of the present invention show its efficacy in retarding glass-to-metal seal degradation in lithium cells. However, these examples are for illustrative purposes only and specific detailed enumerations are not to be construed as limitations.

EXAMPLE 1 (PRIOR ART)

A button type electrochemical cell is made (with the dimensions of 0.450 O.D. and 0.210 height) having a lithium anode, 1 molar lithium tetrachloroaluminate ($LiAlCl_4$) in thionyl chloride ($SOCl_2$) as the electrolyte with the thionyl chloride functioning as the soluble depolarizer material on a carbonaceous cathode. A cell top having the dimensions of 0.436 O.D. by 0.047 inch height comprising an axially centrally diposed metallic rod surrounded by a borosilicate glass (Fusite BF 98, a Fusite K glass) ring which is sealed thereto and an outer metallic annulus surrounding the glass ring and sealed thereto, is welded to the open upper end of a cell container thereby hermetically sealing the cell. The glass ring has the dimensions of 0.362 diameter by 0.047 inch height and weighs 35 mg. The lithium anode is supported on the metallic rod and is directly below the borosilicate glass ring without a protective layer (as described in the present invention) therebetween. After 2 weeks storage at 80° C., the cell is checked with a helium leak detector and is found to leak.

EXAMPLE 2 (PRIOR ART)

A cell top, with Li attached, made in the same manner as the cell top of Examle 1 is tested by refluxing it in a bath of the electrolyte solution for two weeks and is also found to leak.

EXAMPLE 3

A cell is made in the same manner as the cell of Example 1 but with a coating of aluminum oxide on the exposed inner surface of the glass ring. The aluminum oxide coating is applied to the inner surface of the glass ring prior to the cell assembly. About 10 mg of aluminum oxide are mixed with a benzene solvent until a pasty mixture is obtained. Thereafter this paste is applied to the exposed inner surface of the glass ring. The glass ring with the pasty coating is heated to 1000° C. for 15 minutes (the volatile benzene is driven off) and thereafter annealed at 400° C. for another 15 minutes. The cell is made as in Example 1 and stored for two weeks at 80° C. The cell is tested with a helium leak detector and is found to be hermetic.

EXAMPLE 4

A cell top, with lithium attached, made in the same manner as the cell top of Example 3 is tested by refluxing it in a bath of the electrolyte for two weeks and is found to be hermetic.

EXAMPLE 5

A cell made in the same manner as the cell of Example 3 but with about 6 mg of calcium oxide (CaO) in place of the aluminum oxide is similarly tested and is found to be hermetic.

EXAMPLE 6

A cell top, with lithium attached, made in the same manner as the cell top of Example 5 is tested by refluxing it in an electrolyte bath for two weeks and is found to be hermetic.

The foregoing examples are given as illustrative of the advantages of the present invention as compared to that of the prior art and it is understood that changes and variations can be made without departing from the scope of the present invention as defined in the following claims.

What is claimed is:

1. An electrochemical cell comprising a lithium anode, an electrolyte and a cathode within a container with said container having a glass-to-metal seal as a part thereof, the glass of said seal being subject to degradation in a lithium environment, substantially the entire surface of said glass exposed to the interior of said container being adherently coated with a material comprising a member of the group consisting of metal oxides having a free energy of formation in excess of $-100$ Kcal/gm-atom of oxygen at 300° K., polyolefins, and adhering polymeric fluorocarbons.

2. The electrochemical cell of claim 1 wherein said glass is selected from the group consisting of silicates and borosilicates.

3. The electrochemical cell of claim 1 wherein said metal oxide is selected from the group consisting of aluminum oxide, calcium oxide, niobium oxide, magnesium oxide and barium oxide.

4. The electrochemical cell of claim 3 wherein said cathode is selected from the group consisting of fluid oxyhalides, flid non-metallic oxides, fluid non-metallic halides, metal halides, metal oxides, metal chromates and dichromates, metal permanganates and periodates, metal molybdates, metal vanadates, metal chalcogenides, and mixtures thereof.

5. The electrochemical cell of claim 4 wherein said cathode is selected from the group consisting of sulfur dioxide and thionyl chloride.

6. The electrochemical cell of claim 1 wherein said polyolefin is selected from the group consisting of polyethylene and polypropylene.

7. The electrochemical cell of claim 1 wherein said polymeric fluorocarbon is selected from the group consisting of copolymers of fluorinated ethylene and propylene, homopolymers of vinylidene fluoride, copolymers of ethylene and tetrafluoroethylene, chlorotrifluoroethylene resins, copolymers of ethylene and chlorotrifluoroethylene, polyvinyl fluoride resins, and polymers having a fluorocarbon backbone and a perfluoro alkoxy side chain wherein the alkoxy radical contains from 1-6 carbon atoms.

8. A method of preventing degradation of a glass-to-metal seal in a cell having a lithium anode comprising the steps of coating substantially the entire surface of said glass which is exposed to the interior of said cell with a material selected from the group consisting of metal oxides having a free energy of formation in excess of $-100$Kcal/gm-atom of oxygen at 300° K., polyolefins and adherable polymeric fluorocarbons.

9. The method of claim 8 wherein said coating material is a metal oxide and is adhered to said glass by heating said glass and said metal oxide to a temperature at which the glass becomes tacky.

10. The method of claim 9 wherein said metal oxide is applied to said glass by applying said metal oxide as a powder dispersed in a volatile solvent, and removing said solvent by said heating step.

* * * * *